United States Patent [19]
Landrum

[11] Patent Number: 5,172,983
[45] Date of Patent: Dec. 22, 1992

[54] ECCENTRIC ROD BEARING

[76] Inventor: Anderson Landrum, Rte. 2. Box 311MM, Jackson, Miss. 39209

[21] Appl. No.: 652,678

[22] Filed: Feb. 6, 1991

[51] Int. Cl.$^5$ .................. F16C 9/06; F16C 23/10; F02B 75/04
[52] U.S. Cl. .................. 384/294; 123/48 B; 384/255; 384/270
[58] Field of Search .............. 384/294, 262, 268, 270, 384/255, 288, 429, 430; 123/48 B

[56] References Cited

U.S. PATENT DOCUMENTS

| | | | |
|---|---|---|---|
| 1,987,661 | 1/1935 | Blauvelt et al. | 123/48 B X |
| 2,542,405 | 2/1951 | Fink | 384/270 |
| 2,897,804 | 8/1959 | Crooks | 123/48 B X |
| 3,046,953 | 7/1962 | Dolza | 384/294 X |
| 4,073,550 | 2/1978 | Yahraus | 384/294 X |
| 4,084,553 | 4/1978 | Forde et al. | 123/48 B |
| 4,488,826 | 12/1984 | Thompson | 384/288 |
| 4,864,975 | 9/1989 | Hasegawa | 123/48 B |

FOREIGN PATENT DOCUMENTS

| | | | |
|---|---|---|---|
| 696249 | 11/1979 | U.S.S.R. | 384/430 |
| 1123827 | 11/1984 | U.S.S.R. | 384/429 |

*Primary Examiner*—Thomas R. Hannon
*Attorney, Agent, or Firm*—Alexander F. Norcross

[57] ABSTRACT

A connecting rod crankshaft bearing, provided for installation in the connecting rod at the crankshaft end, eliminates the necessity for reaming out the ridge in a cylinder during rebuilding. The rod bearing is an eccentric bearing, provided as two semi-circular sections having a slightly greater thickness along the lower section than on the upper section so as to offset the center of the inner surface from the outer surface of the bearing.

This offset restricts the uptravel of the connecting rod. This in turn lowers the position of the piston during reciprocating travel by the same amount, eliminating possible impact with wear ridges within the cylinder. The cylinder thus need not be reamed to remove these ridges, as they no longer present a source of damaging impact during piston travel.

7 Claims, 3 Drawing Sheets

ECCENTRIC ROD BEARING

BACKGROUND OF THE INVENTION

This invention relates to the field of bearings for internal combustion engine connecting rod.

As is known in the art internal combustion engines are generally constructed in the form of a piston within a cylinder to form a combustion chamber. The piston is in turn connected through a pivoted connecting rod which is pivoted at an upper end to a pin in the piston and a lower end is connected to an offset crank shaft rod journal.

The entire force of the engine is exerted through the connecting rod in tension and compression against the crankshaft to be converted into rotary engine motion. In order to reduce friction and resist the loads, a bearing is then placed within the lower end of the connecting rod, where it connects to the crankshaft. This bearing is lubricated with pressurized oil through the crankshaft through internally provided oil passages within the bearing, and the connecting rod in fact rides and pivots upon a thin film of oil as the bearing is an otherwise high tolerance or tight fit, required to avoid vibration, impact and slope and loss of power in transferring the reciprocating motion of the piston into the rotary motion of the crankshaft.

In order for the piston to function properly within the cylinder, it is known that the piston is provided with certain compressed piston rings lubricated by oil which is slung into the pistons and on the cylinder walls by centrifugal force by rotation of the crankshaft rod throw as oil is forced from between the rod journal and the rod bearing. This oil also provides a gas tight seal permitting the development of adequate compression, efficient burning, and transfer of the force generated by expanding burned gas to the piston. These piston ring seals are vital to the successful operation of a reciprocating engine and are deliberately designed to absorb the frictional wear and the reciprocating motion of the piston within the cylinder, as they may be readily replaced.

However, operation of the piston within the cylinder tends to wear the cylinder walls where the piston rings travel. Thus, after a period of usage of the engine, it will be found that the cylinder walls have been worn by the piston rings to a slightly greater inside diameter than the original inside diameter of the cylinder. In effect, this forms a small but significant ridge within the cylinder extending from immediately above the upper travel of the upper piston ring when the piston is at top dead center to the top of the cylinder wall within the engine block.

When an engine is rebuilt to extend its life, the wearable bearing components are replaced and this includes the connecting rod and crankshaft bearings as well as the piston rings. In reassembling the engine, the piston is removed and inserted through the top of the cylinder head using various well known tools to compress the piston rings around the piston and allow the piston to be slid into the cylinder. However, operation of the engine would result in impact of the replaced piston ring against the ridge that has been formed by the previous wear of the piston rings within the cylinder. This impact in turn would damage or break the top ring and bend or break the land on the piston and cause ultimately catastrophic failure of the engine. In order to prevent this, it is therefore necessary to ream the ridge out of the cylinder, typically by the use of a ridge reamer. Unfortunately, the cylinder as originally constructed in the engine block is provided with a slight taper at its upper end so as to permit easy entry of the piston rings when inserted. Reaming out the ridge provides a sharp corner at the upper end of the cylinder wall in the engine block and this in turn can result in chipping and breakage of piston rings which is undetected by the repair person during insertion and can lead subsequently to failure.

The reaming process also requires special tools and a considerable amount of skill in order to avoid reaming the ridge to other than a perfect cylindrical shape which must be maintained to a high tolerance in order that the replaced piston rings will form a gas tight seal.

If the cylinder is excessively reamed below the ridge, gas leakage or blowby will occur. If the reaming does not maintain a high tolerance cylindrical shape, the top ring could wedge and fracture the piston. Insufficient reaming, on the other hand, may permit the top ring to make contact with a portion of the ridge not removed, which could also cause the top ring to wedge or fracture the piston.

SUMMARY OF THE INVENTION

It is the discovery of the inventor that the aforementioned problems involved in reaming the ridge from the cylinder upon engine rebuilding and piston ring replacement may be avoided by providing instead an eccentric rod bearing for installation in the connecting rod at the crankshaft end.

This rod bearing as described below varies from the presently used symmetrical rod bearing of the prior art by having a slightly greater thickness along the lower section than on the upper section so as to offset the bearing hole aperture provided for connecting the rod to the crankshaft rod journal. This offset in a typical example reduces the uptravel of the piston by 7/1000 of an inch (0.007), in effect lowering piston Top Dead Center by this amount.

It has been found that by installing the eccentric rod bearings of the invention that a piston with new piston rings is lowered a sufficient distance below the level of the ridge previously formed in the cylinder, that impact of piston ring and ridge never occurs. The engine can be successfully operated with the replaced piston rings and the new rod bearing without the necessity of reaming out the ridge remaining in the cylinder.

This is particularly of use to amateur mechanics and do-it-yourself car repair persons who then are able to rebuild and restore the efficiency of a piston engine without having to learn the skills necessary to successfully ream the ridges from the cylinder walls within the engine block.

It is thus an object of the invention to provide a device which permits a mechanic to rebuild a reciprocating internal combustion engine without the necessity of reaming out ridge on the cylinder walls.

It is further an object of this invention to provide a device which permits a mechanic of more limited skills to successfully rebuild an internal combustion engine using limited tools and skill.

It is a further object of this invention to disclose a device which permits the skilled shop mechanic to overhaul an engine in much less time and therefore be able to charge less.

It is a further object of this invention to reduce the overhaul procedure to engine disassembly, removing worn parts, replacing them with new ones, and reassembly.

These and other objects of the invention will be more clearly seen from the detailed description of the preferred embodiment which follows.

DETAILED DESCRIPTION OF THE PREFERRED EMBODIMENT

Figure 1:
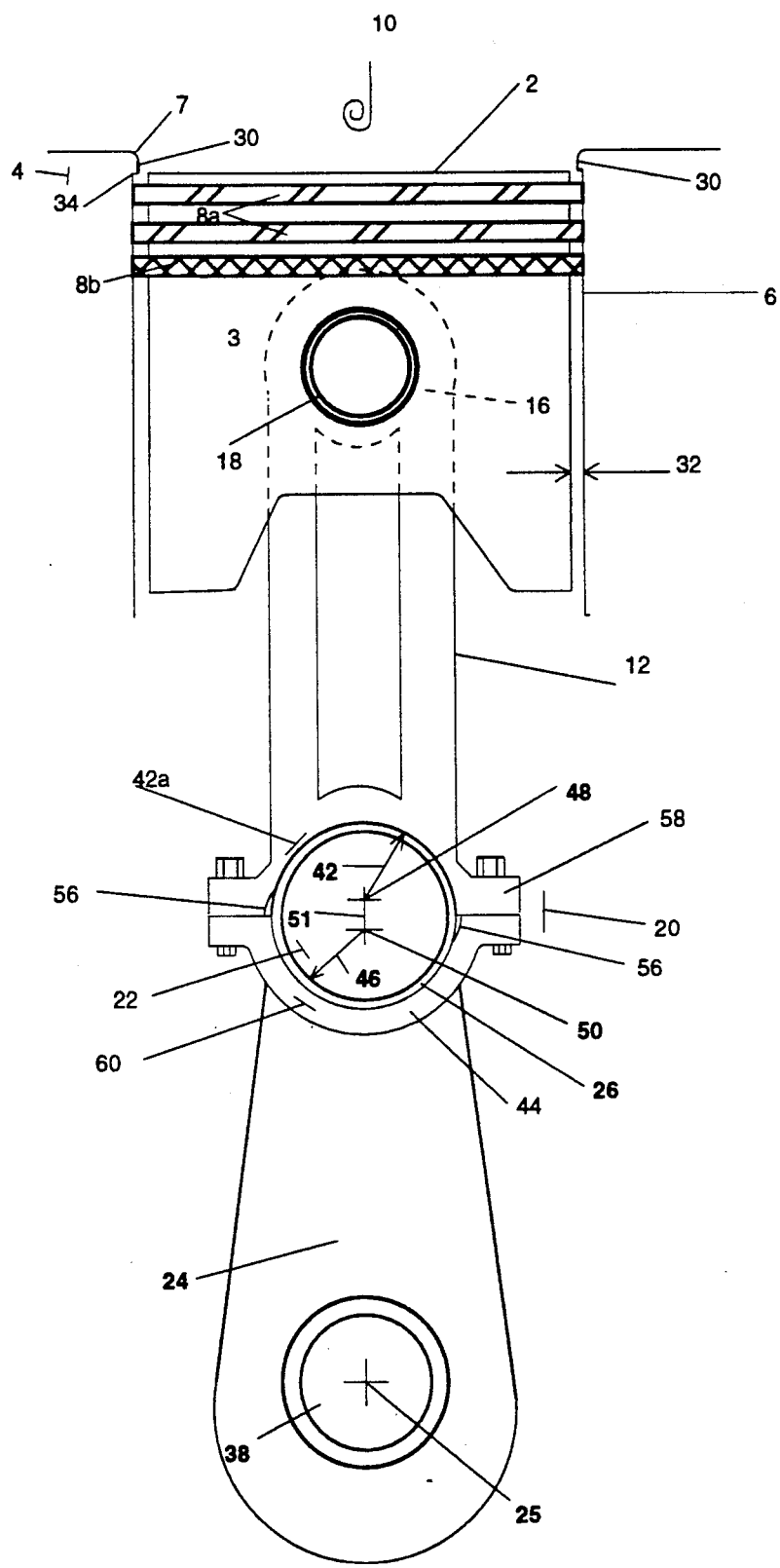
FIG. 1 is a side view of a figurative piston, at top dead center, showing, in cutaway view, piston rings within a worn cylinder, and the connecting rod, inventive bearing and crankshaft.
Figure 2:
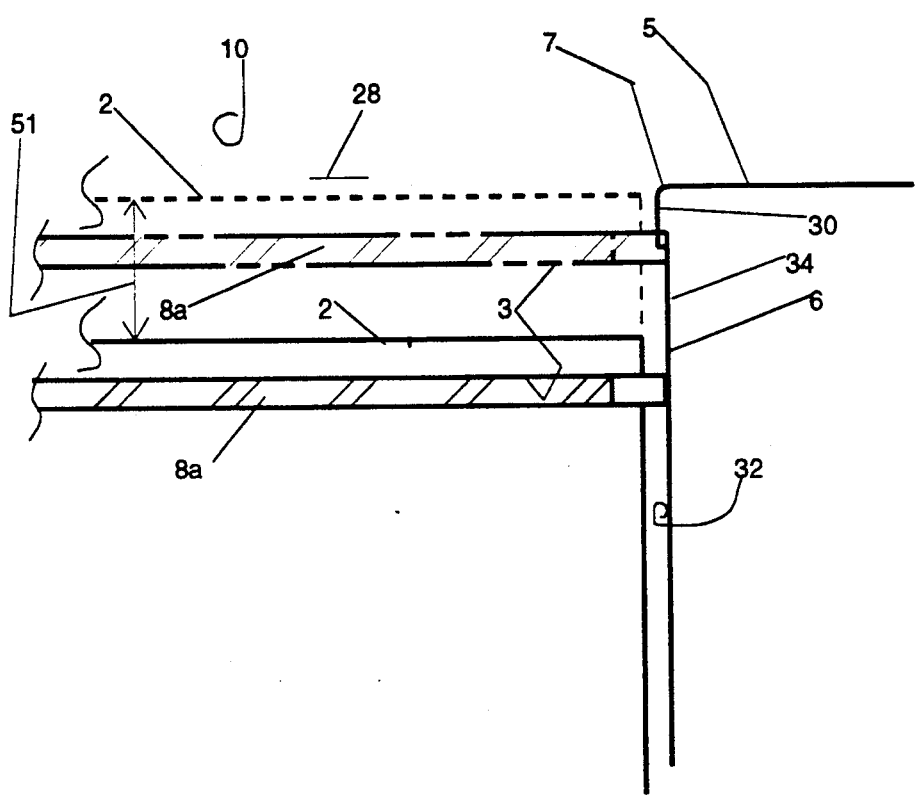
FIG. 2 is a detailed section view of a figurative piston, showing top dead center if a prior art bearing were installed without reaming, and in contrast, top dead center after installation of the inventive bearing, showing the reduced uptravel, equal to the offset of the bearing centers.
Figure 3:
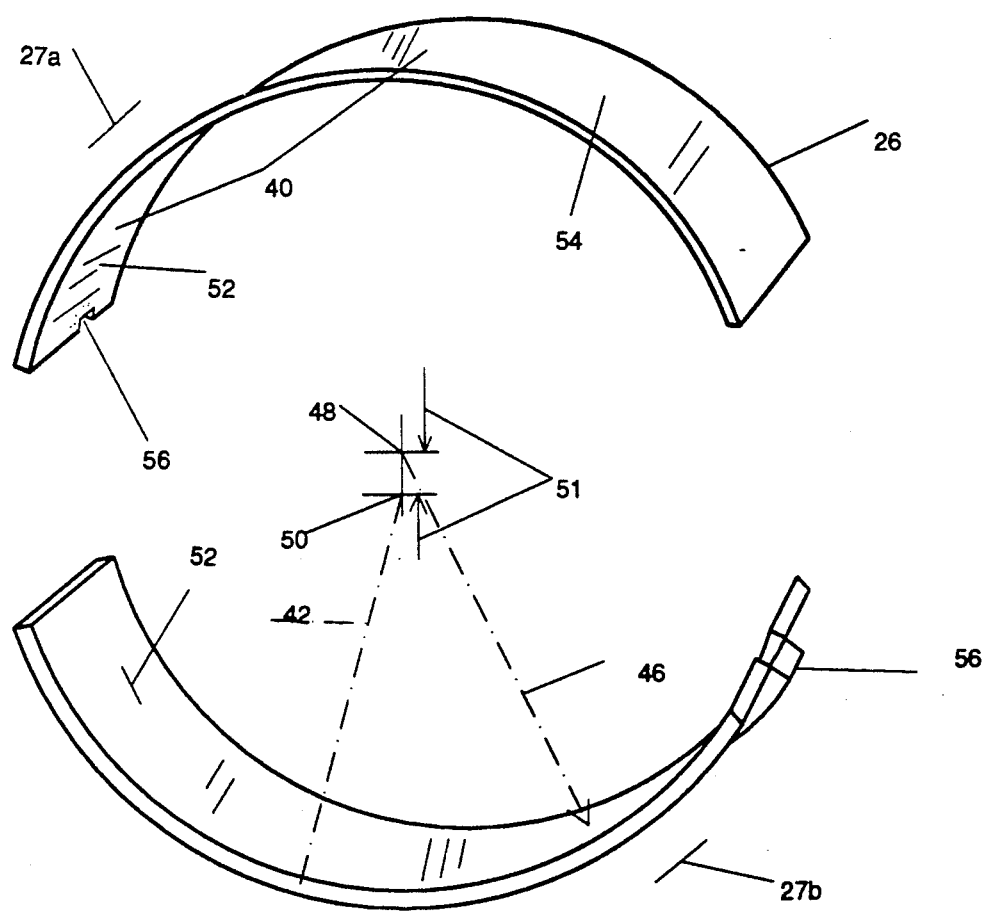
FIG. 3 is a view of the bearings of the invention, as provided as segments, as ready for installation in the lower end of the connecting rod.

Referring to FIGS. 1 and 2, I show, as a component of a typical internal combustion engine (not shown), a piston 2 fit within a cylinder 4 to provide reciprocating motion, and sealed against the cylinder wall 6 by a plurality of piston rings 8. These rings 8 are known to have varying designs: the two upper piston rings are denoted compression rings 8a, and are particularly designed to provide a gas tight seal in contact between the piston 2 and the cylinder wall 6; the lower ring is known as an oil control ring 8b and is designed especially to scavenge excessive oil from the cylinder wall 6, preventing oil pumping into the combustion chamber.

A connecting rod 12 is connected for operative transfer of power from the piston 2 to a crankshaft 24. Connecting rod 12 is pivotally connected at an upper end 16 through a piston pin 18 to the piston 2 and is connected pivotally at a lower end 20 through a crankshaft rod journal 22, offset from the center line of rotation 25 of the crankshaft 24. As is known, this structure provides for conversion of the reciprocating motion of the piston 2 to rotary motion of the crankshaft 24.

Between the lower end 20 of the connecting rod 12 and the crankshaft rod journal 22 is placed a rod bearing 26. This is an oil lubricated sleeve bearing usually having a steel base coated with a layer of bearing material. The rod bearing 26 is lubricated with a thin film of oil through well known provided bearing lubrication holes, not shown here.

This rod bearing 26 receives the entire force of the engine cylinder power stroke and is one of the high wear components within a reciprocating engine. During combustion, cylinder pressure can exceed 400 pounds per square inch in a typical gasoline engine; a diesel engine generates even greater pressure. Since this pressure is exerted during the power downstroke, wear is concentrated on the top side 26a of the rod bearing 26.

Referring to FIG. 2, it can be seen that during engine operation, the compression ring 8a around the piston 2 does not travel all the way to the top of the cylinder 4 as the piston 2 rises to the top dead center position 28. As the engine is operated, compression ring 8a, through friction, wears away that portion of the cylinder wall 6 upon which it rides, leaving a ridge 30 near the top of the cylinder 4 which defines a portion of the cylinder 4 of a lesser diameter than the worn portion. It is known that the piston rings 8 are of a flexible construction so that they will expand to fill the space between the piston 2 and the cylinder wall 6, even as they wear.

These same forces that cause the compression ring 8a to wear away at the cylinder wall 6 also act upon the compression ring 8a making this ring narrow gradually through wear. Each piston ring 8 is retained between groove lands 3 in piston 2. Groove lands 3 supports the top and bottom of each piston ring 8 while allowing the ring to expand against the cylinder wall 6. As the piston 2 changes direction during reciprocating motion in the cylinder, it rocks from side to side; this causes the piston ring 8 to move with respect to the groove lands 3, causing wear of the piston ring 8. For this reason the piston ring becomes thinner during wear.

A replacement ring 8 is thus of a thicker vertical dimension than the worn ring 8 being replaced. As a result, operation of the engine with replaced rod bearings 26 and piston rings 8 would cause the compression ring 8a to impact upon the bottom of the ridge 34, figuratively shown in FIG. 2. This will result in damage to the compression ring 8a and bending or breakage of the groove lands 3 within which the ring 8a is inserted; this damage will rapidly cause catastrophic failure of the piston ring 8 and piston 2 within the cylinder 4 during operation. As a result, piston ring manufacturers uniformly direct that the ridge 30 be reamed out of the cylinder 4 when piston rings are replaced.

Further, it is typical when rebuilding an engine that the rod bearings 26 are replaced at the same time the piston rings 8 are replaced, and in many cases the main crankshaft bearings 38 are also replaced and renewed. The cummulative effect of bearing wear on rod bearings 26 and crankshaft bearings 38 lowers the uptravel of the piston (which is against pressure), thus lowering Top dead Center 28. Replacemant of these bearings removes this wear, raising the uptravel or Top Dead Center, and this further increases the need for removal of the ridge 30.

The process of reaming the ridge 30 is tedious and time consuming even for a skilled mechanic with high quality tools. A novice mechanic, or a person who only occasionally works on an engine may find it too difficult to successfully complete. The instructions for operating a ridge reamer place a great burden upon the skill and knowledge of the user. The user is warned not to excessively ream the cylinder 4 and not to ream beyond a certain depth as such will damage the cylinder walls 6 rendering the engine useless. If, as is usual for casual mechanics, the engine is not completely pulled from the vehicle during this process, it is very difficult to successfully ream those cylinders 4 which are close to engine obstruction such as the firewall. Lack of access to these obstructed cylinders 4 in turn may result in uneven cutting by the reamer and damage to the cylinder 4.

Even when the cylinder 4 is correctly reamed, the reaming process removes the bevel 7 originally placed by the manufacturer at the entrance to the cylinder 4 leaving a sharp corner at the upper end of the cylinder 4. This sharp corner makes it very difficult to install rings 8 into the cylinder 4. While it is known that rings 8 are compressed within a ring compressor to allow the piston 2 to be started into the cylinder 4, the piston must be slid from the compressed sleeve into the cylinder 4.

A novice mechanic is very likely to chip or break a ring 8 when attempting this insertion into a sharp cornered cylinder.

The invention eliminates these problems by providing an eccentric rod bearing 26 which makes removal of the ridge 30 unnecessary. The inventive rod bearing is constructed in two facing segments 27a,27b, each having two bearing surfaces: an inner bearing surface 52 and an outer bearing surface 54, both formed so that, when segments 27a and 27b are joined each of the two bearing surfaces form a substantially cylindrical shape. Outer bearing surface 54 forms a cylindrical shape which has an outer circular diameter 42 equal to the diameter 42a of the aperture of the connecting rod 12 retaining the bearing 26. Inner bearing surface 52 forms a cylindrical shape which has an inner diameter 46 slightly larger than the diameter of crankshaft rod journal 22, to permit adequate oil flow for lubrication.

However, the center, or axis, 48 of the inner bearing surface 52, which is the same as the center of the crankshaft rod journal 22, is offset by an offset distance 51 from the center, or axis, 50 of the outer bearing surface 54, which is the same as an imaginary center about which the lower end 20 of the connecting rod 12 pivots. This offset distance 51, in one typical example 0.007 (seven thousandths) of an inch, restricts the uptravel of the rod 12 and piston 2 by the amount of the offset distance 51.

This offset distance 51 is depicted in exaggerated scale in the figures for illustration. It is equivalent to making the lower segment 27a thicker than the upper segment 27b by the offset distance 51, although it is clear to those skilled in the art that the thickness of the segments 27a,27b would be continuously variable, and the offset distance 51 would be the difference of thickness at a point of maximum thickness in lower segment 27a opposite a point of minimum thickness in upper segment 27b.

Insert rod bearings 26 are normally built as two semicircular segments, equipped with small lugs 56 which are recessed into grooves within the connecting rod 12 and the connecting rod cap 44. These lugs prevent the rod bearing 26 from turning in the bearing aperture of the connecting rod 12, once the rod cap 44 is secured in place.

The eccentric rod bearing 26 of the invention is thus built of two segments, having differing thicknesses so as to create offset distance 51 between the centers 48,50. Alignment of the two pieces so as to form the eccentric rod bearing 26 within the connecting rod 12 is easily accomplished, as the lugs 56 provide sufficient alignment positioning. The center line offset 51 may be accurately maintained with respect to the connecting rod 12.

Offset 51 restricts the uptravel of the piston, lowering top dead center 28 by an equal amount from the top dead center 28 which would have existed had rod bearing 26 been replaced with a new prior art rod bearing, as shown in FIG. 2. Offset 51 also increases the downstroke or lower position of the piston 2 by the same amount. However, the oil control ring 8b or bottom ring is well lubricated and operates at a much lower temperature than the compression ring 8b; thus the oil control ring 8b does not form a significant ridge. Any ridge that may tend to form is worn away by piston friction leaving a slight wavy effect, and any impact during the downstroke is not deleterious.

As an example, a 200 cubic inch reciprocating gasoline engine that had been operated for 127,000 miles was rebuilt. It was found that the installation of new piston rings, new main bearings and a new standard rod bearing of the prior art increased the top dead center or uptravel of the new compression ring by four point five thousands (0.0045) of an inch. Eccentric rod bearings of the design having centers offset (51) by 0.007 of an inch were installed. Upon starting of the engine there was no noise or other indication that the new compression ring 8a was making contact with the ridge 30. After two hours of operating the engine at varying speeds, the pistons 2 were removed and inspected. There were no indications that the compression ring 8a had made any contact with the ridge 30.

That piston 2 had a reduced uptravel of 0.007 of an inch did not materially affect the operation of the engine after rebuilding. In this context it should be noted that normal replacement of the factory installed original issue head gasket with a standard replacement gasket, as distributed in the automotive after market, results in a markedly larger change of head space; after compression, the factory gasket measured 0.022 inch thick while the replacement gasket measured 0.057 inch, an increase in headspace equivalent to reducing top dead center 28 of the piston 2 by 0.025 inch. Thus standard rebuilding practices result in a change in the effective internal piston compression within a cylinder over four times as great as installation of the eccentric rod bearing 26, without a noticeable degradation in engine performance.

Prior to overhaul, compression was measured in each of the six cylinders. The average pressure was 132 psi before overhaul; The lowest measurement was 128 psi. After overhaul and installation of the new bearing, the engine was run for 2,000 miles and the compression check was made again. Compression readings showed the average pressure to be 153 psi; the lowest reading was 150 psi. These pressures are considered to be in the normal range of a new engine. Application of the eccentric rod bearing does not appear to cause a recordable effect on cylinder compression.

In a second example, a thin coat of metal blue was applied on the interior of a cylinder 4 on and adjacent to the ridge 30. The engine was then reassembled and run, the spark plug wire being removed from the measured cylinder 4. The pistons were again removed and it was found that the metal blue had been worn upward near the ridge 30 but not to the base 34 of the ridge. Approximately 0.0025 inches of space were observed still coated with metal blue beneath the ridge 30 indicating sufficient clearance of the ridge by the new compression ring 8a.

After these two tests, the engine with the eccentric rod bearing was then reassembled and operated for 56,000 miles. No change in gas mileage and oil consumption could be detected.

It can thus be seen that the bearing 26 of the invention permits an engine to be reassembled, and piston rings to be replaced without requiring the mechanic to ream out the ridge in the cylinder.

It will of course be apparent that the offset within a given eccentric rod bearing will have to be designed specifically for a given size of engine, but from the example shown, the amount of offset should be readily determinable by a skilled designer in the art for bearings for the after market trade.

A specific example has been shown in the detailed description above but it should be apparent that the invention extends to the more generic device as claimed.

I claim:

1. An improved reciprocating engine rod end bearing for replacement of a used rod end bearing of standard design in a worn reciprocating engine comprising:
    a bearing having an inner cylinder surface defined by a first center and an outer cylindrical surface defined by a second center;
    said first center being offset from said second center by an amount sufficient to lower the piston top dead center within the engine a distance greater than a cylinder wear ridge length within the engine.

2. The bearing of claim 1 further comprising:
    said bearing being formed of two semi-cylindrical sections;
    means upon said semi-cylindrical sections for aligning said bearing within a connecting rod.

3. A connecting rod end bearing for use in a worn reciprocating engine to replace a worn rod end bearing of conventional design comprising:
    a bearing for insertion within a connecting rod;
    means within said bearing for lowering the top dead center position of a piston operatively connected to said connecting rod whereby piston rings on said piston will not contact a wear ridge within said worn engine.

4. The apparatus of claim 3 wherein said means for lowering further comprises:
    said bearing having an inner cylindrical surface defined by a first center and an outer cylindrical surface defined by a second center;
    said first center being offset from said second center;
    said offset being substantially equal to the lowering of the top dead center position;
    said offset being substantially equal to or greater than several thousandths inches.

5. The apparatus of claim 3 wherein said means for lowering further comprises:
    said bearing comprising an upper and a lower segment;
    said lower segment being thicker than said upper segment by an offset;
    said offset being equal to or greater than several thousandths inches.

6. An improved connecting rod end bearing, of the type having two facing curved segments, for use in a reciprocating engine comprising:
    said segments being an upper and a lower segment;
    said segments defining an inner and an outer cylindrical surface;
    said lower segment being thicker than said upper segment by an offset.

7. The apparatus of claim 6 further comprising:
    said bearing aligned within an end of a connecting rod, said offset lowering the top dead center position of a piston operatively connected to said connecting rod.

* * * * *